US 9,606,727 B2

(12) United States Patent
Seo et al.

(10) Patent No.: US 9,606,727 B2
(45) Date of Patent: Mar. 28, 2017

(54) APPARATUS AND METHOD FOR PROVIDING USER INTERFACE PROVIDING KEYBOARD LAYOUT

(75) Inventors: Yong Chang Seo, Seoul (KR); Jin Ho Seo, Goyang-si (KR)

(73) Assignee: Yong Chang Seo, Seoul (KR)

(*) Notice: Subject to any disclaimer, the term of this patent is extended or adjusted under 35 U.S.C. 154(b) by 581 days.

(21) Appl. No.: 14/126,823

(22) PCT Filed: Jun. 12, 2012

(86) PCT No.: PCT/KR2012/004637
§ 371 (c)(1),
(2), (4) Date: Jan. 13, 2014

(87) PCT Pub. No.: WO2012/173378
PCT Pub. Date: Dec. 20, 2012

(65) Prior Publication Data
US 2014/0115523 A1    Apr. 24, 2014

(30) Foreign Application Priority Data
Jun. 15, 2011    (KR) .................. 10-2011-0058023

(51) Int. Cl.
*G06F 3/0488* (2013.01)
*G06F 3/023* (2006.01)

(52) U.S. Cl.
CPC ........ *G06F 3/04886* (2013.01); *G06F 3/0233* (2013.01); *G06F 3/0236* (2013.01); *G06F 3/04883* (2013.01); *G09G 2354/00* (2013.01)

(58) Field of Classification Search
None
See application file for complete search history.

(56) References Cited

U.S. PATENT DOCUMENTS

| 6,104,317 A * | 8/2000 | Panagrossi .......... G06F 3/04883 178/18.01 |
| 2002/0027549 A1* | 3/2002 | Hirshberg ............. G06F 3/0234 345/168 |

(Continued)

FOREIGN PATENT DOCUMENTS

| CN | 1967459 A | 5/2007 |
| CN | 101572746 A | 11/2009 |

(Continued)

OTHER PUBLICATIONS

Extended European Search Report mailed May 28, 2015, issued in corresponding European Application No. EP 12800563.4, filed Jun. 12, 2012, 8 pages.

*Primary Examiner* — Maryam Ipakchi
(74) *Attorney, Agent, or Firm* — Christensen O'Connor Johnson Kindness PLLC

(57) ABSTRACT

An apparatus for providing a user interface, which provides a keyboard layout, is provided. A display portion of a user interface apparatus displays a portion of a plurality of keys that are included in the keyboard layout, and provides individual input keys of at least a predetermined size inside a display area that is limited by not displaying the portion of the plurality of keys. The keys which are displayed on the display portion comprise a first input key, which is allocated to a first character, and a second input key, which is allocated to a second character that differs from the first character. In this case, when a sensor portion detects user input with respect to the first input key, and the first input key moves to a position of the second input key by means of the user input, so that the first input key comes closer to the second input character to be at a distance shorter than a predetermined critical value, a processor decides a third character, which differs from the first and second characters, as a current input value that corresponds to the user input, (Continued)

wherein the third character corresponds to a character which is not separately displayed as an individual input key by the display portion.

17 Claims, 12 Drawing Sheets

(56) References Cited

U.S. PATENT DOCUMENTS

| | | |
|---|---|---|
| 2004/0263487 A1 | 12/2004 | Mayoraz |
| 2010/0245276 A1* | 9/2010 | Sim ..................... G06F 3/04886 345/173 |
| 2011/0221678 A1* | 9/2011 | Davydov .............. G06F 3/0486 345/168 |

FOREIGN PATENT DOCUMENTS

| | | |
|---|---|---|
| JP | 2005-352569 A | 12/2005 |
| JP | 2006-005823 A | 1/2006 |
| JP | 2009-211421 A | 9/2009 |
| JP | 2011-090461 A | 5/2011 |
| JP | 2011-197848 A | 10/2011 |
| KR | 1020080108881 A | 12/2008 |
| KR | 1020090017188 A | 2/2009 |
| KR | 1020090035409 A | 4/2009 |
| KR | 1020100027329 A | 3/2010 |
| KR | 1020100042998 A | 4/2010 |
| KR | 1020110003130 A | 1/2011 |
| WO | 02/095524 A2 | 11/2002 |
| WO | 2009/054809 A1 | 4/2009 |
| WO | 2009/142880 A1 | 11/2009 |

* cited by examiner

APPARATUS AND METHOD FOR PROVIDING USER INTERFACE PROVIDING KEYBOARD LAYOUT

TECHNICAL FIELD

The present invention relates to a user interface (UI) providing apparatus for key input, and more particularly, to a UI providing apparatus for key input in a touch screen environment.

BACKGROUND ART

Recently, there has been an increasing interest in mobile terminals. The mobile terminals include a smart phone, a general feature phone, a personal digital assistant (PDA), and the like. For such a mobile terminal, use of a touch input based key input interface is increasing.

Due to characteristics of mobile terminals, when an existing QWERTY key arrangement is displayed, many keys are to be displayed on a limited display. A relatively small area may be assigned to a single key and thus, a possibility of typographical errors occurring may increase when an input is provided, and a user having poor eyesight may experience a difficulty in identifying keys.

In particular, people having big fingers are inconvenienced by difficult inputs to smart phones. For example, an adult, a male, and a person of western descent having bigger hands, in general, than a child, a female, and a person of Asian descent experience input errors when using smart phones.

As a solution to such an issue, a text entry interface using speech recognition is suggested. However, in a case of the speech recognition, leaving a recognition accuracy out of a discussion, a message to be input is to be spoken. Thus, such speech may disturb others or incur risks of exposing user privacy or business secrets. A speech recognition based text entry may be useful only when the user is in an environment in which the user does not have to be wary of others, for example, in the privacy of a room or a vehicle.

Since a typing type keyboard still holds a significant role in a mobile device, there is a desire for an input interface apparatus for providing an intuitive and user friendly keyboard layout while reducing a possibility of typographical errors occurring.

DISCLOSURE

Technical Solutions

According to an aspect of the present invention, there is provided an apparatus for providing a user interface (UI) providing a keyboard layout, the apparatus including a display to display a first input key assigned to a first character, and a second input key assigned to a second character differing from the first character, a sensor to sense a user input with respect to the first input key, and a processor to determine a third character differing from the first character and the second character to be a current input value corresponding to the user input, when the first input key is moved to a position of the second input key and positioned at a distance less than a preset threshold from the second input key in response to the user input.

Throughout the entire disclosure, according to another embodiment of the present invention, the process of determining the current input value when the first input key is positioned at the distance less than the threshold from the second input key may be replaced with a process of determining a current input value when the first input key is moved toward the second input key such that an area of a portion in which the first input key and the second input key overlap is greater than or equal to another threshold. The same shall apply hereinafter unless otherwise mentioned.

A plurality of input keys provided in the keyboard layout may be arranged to form a matrix, and the first input key and the second input key may be displayed to be disposed adjacent to each other in an identical row within the matrix.

The display may display a third input key assigned to a fourth character differing from the first character and the second character and disposed adjacent to the first character in an identical column within the matrix, and the processor may determine a first numeral assigned to correspond to positions of the first input key and the third input key to be the current input value corresponding to the user input, when the first input key is moved to a position of the third input key and positioned at a distance less than the threshold from the third input key in response to the user input.

The display may display a fourth input key assigned to a fifth character differing from the first character and the second character and disposed adjacent to the first character in a diagonal direction within the matrix, and the processor may determine a first special character assigned to correspond to positions of the first input key and the fourth input key to be the current input value corresponding to the user input, when the first input key is moved to a position of the fourth input key and positioned at a distance less than the threshold from the fourth input key.

The processor may not determine the second character or the third character to be the current input value, when the first character is repositioned at a distance greater than or equal to the threshold in response to the user input while the user input is maintained, even after the first input key is moved to the position of the second input key and positioned at the distance less than the preset threshold from the second input key in response to the user input.

In this example, the display may display the third character to fade in when the first input key is moved to the position of the second input key and positioned at the distance less than the preset threshold from the second input key in response to the user input, and display the third character to fade out when the first character is repositioned at the distance greater than or equal to the threshold in response to the user input while the user input is maintained.

The keyboard layout may display at least a portion of alphabetic characters from A to Z and omit a remaining portion, by alternately displaying one of the alphabetic characters from A to Z and omitting another.

For example, by displaying A, C, E, G, and I and not displaying B, D, F, H, and J, a number of input keys to be actually provided may be reduced.

The keyboard layout may display at least a portion of a plurality of input keys included in a QWERTY keyboard layout and omit a remaining portion, by alternately displaying one of a plurality of alphabetic characters arranged sequentially in the QWERTY keyboard layout and omitting another.

For example, in a conventional QWERTY keyboard layout in which characters are displayed in an order of Q, W, E, R, T, Y, U, I, O, and P, by displaying Q, E, T, U, and O and not displaying W, R, Y, I, and P, a number of input keys to be actually provided may be reduced.

The processor may determine the third character differing from the first character and the second character to be the current input value corresponding to the user input, when the first input key corresponds to an input key positioned at an edge of the display among a plurality of input keys displayed by the display to be adjacent to a boundary of the display and the first input key is moved toward the boundary in response to the user input. Each input key on the edge of the display may include an extra input key in addition to a combination of the each input key and a neighboring input key.

In this example, when the first input key is positioned at a distance greater than or equal to the threshold from an original position of the first input key, the third character may be determined to be the current input value corresponding to the user input.

According to another aspect of the present invention, there is also provided an apparatus for providing a UI providing a keyboard layout, the apparatus including a display to display a plurality of input keys included in the keyboard layout, a sensor to sense a user input with respect to a first input key among the plurality of input keys, and a processor to determine one of a space key, a backspace key, an up arrow key, and a down arrow key to be a current input value corresponding to the user input, when the first input key is moved through a second input key adjacent to the first input key and positioned at a distance less than a preset threshold from a third input key adjacent to the second input key in an opposite direction of the first input key.

The processor may determine the space key to be the current input value corresponding to the user input, when the first input key is disposed on a left side of the third input key within the keyboard layout.

According to still another aspect of the present invention, there is also provided an apparatus for providing a UI providing a keyboard layout, the apparatus including a display to display a first input key assigned to a first character, and a second input key assigned to a second character differing from the first character, a sensor to sense a user input with respect to the first input key, and a processor to calculate a vector corresponding to a movement, when the first input key is moved in response to the user input, and determine a third character differing from the first character and the second character to be a current input value corresponding to the user input, when a direction of the vector is most similar to a direction from a position of the first input key to a position of the second input key, among a plurality of input keys included in the keyboard layout.

According to yet another aspect of the present invention, there is also provided a non-transitory computer-readable medium including a program for providing a keyboard application, the program executed in a computing terminal to provide the keyboard application using a display and a sensor of the terminal, the program including a first command set to display, on the display, a first input key assigned to a first character and a second input key assigned to a second character differing from the first character, a second command set to determine whether a user input corresponds to a combinational input with respect to the first input key and the second input key, when the user input is sensed by the sensor, and a third command set to determine a third character differing from the first character and the second character to be an input value corresponding to the user input, when the user input corresponds to the combinational input with respect to the first input key and the second input key.

The second command set may determine that the user input corresponds to the combinational input, when the user input corresponds to an input in which the first input key is moved toward the second input key after the first input key is selected.

The second command set may calculate a magnitude and a direction of a vector corresponding to a drag, when the user input corresponds to an input in which the first input key is dragged after the first input key is touched, and determine that the user input corresponds to the combinational input, when the magnitude of the vector is greater than or equal to a pre-designated threshold and the direction of the vector is most similar to a direction toward the second input key, among a plurality of input keys provided by the keyboard application.

The second command set may determine that the user input corresponds to the combinational input, when the user input corresponds to a touch and drag input, a start of the touch and drag input is included in a first area corresponding to the first input key, and an end of the touch and drag input is included in a second area corresponding to the second input key.

A keyboard layout provided by the keyboard application may display at least a portion of alphabetic characters from A to Z and omit a remaining portion, by alternately displaying one of the alphabetic characters from A to Z and omitting another.

A keyboard layout provided by the keyboard application may display at least a portion of a plurality of input keys included in a QWERTY keyboard layout and omit a remaining portion, by alternately displaying one of a plurality of alphabetic characters arranged sequentially in the QWERTY keyboard layout and omitting another.

According to further another aspect of the present invention, there is also provided a non-transitory computer-readable medium including a program for providing a keyboard application, the program executed in a computing terminal to provide the keyboard application using a display and a sensor of the terminal, the program including a first command set to display a first input key on the display, and display at least one second input key at a position differing from a position at which the first input key is positioned, the first input key assigned for mode switching among at least a portion of a first language mode corresponding to a first language, a first language mode corresponding to a second language differing from the first language, a numeral input mode, and a special key input mode, a second command set to determine whether a user input corresponds to a combinational input with respect to the first input key and the second input key, when the user input with respect to the first input key is sensed by the sensor, and a third command set to perform the mode switching based on the second input key, when the user input corresponds to the combinational input with respect to the first input key and the second input key.

According to still another aspect of the present invention, there is also provided a method of providing, by a UI apparatus, a UI providing a keyboard layout, the method including displaying, by a display of the UI apparatus, a first input key assigned to a first character, and a second input key assigned to a second character differing from the first character, sensing, by a sensor of the UI apparatus, a user input with respect to the first input key, and determining, by a processor of the UI apparatus, a third character differing from the first character and the second character to be a current input value corresponding to the user input, when the first input key is moved to a position of the second input key and positioned at a distance less than a preset threshold from the second input key in response to the user input.

According to yet another aspect of the present invention, there is also provided a method of providing, by a UI apparatus, a UI providing a keyboard layout, the method including displaying, by a display of the UI apparatus, a first input key assigned to a first character, and a second input key assigned to a second character differing from the first character, among a plurality of characters included in the keyboard layout, sensing, by a sensor of the UI apparatus, a user input with respect to a first input key, and determining, by a processor of the UI apparatus, a third character differing from the first character and the second character to be an input value corresponding to the user input, when it is determined that the user input corresponds to an input in which the first input key is touched and dragged in a first direction and the first direction corresponds to a direction toward the second input key, among input keys, respectively, corresponding to the plurality of characters.

The keyboard layout may display at least a portion of alphabetic characters from A to Z and omit a remaining portion, by alternately displaying one of the alphabetic characters from A to Z and omitting another.

The keyboard layout may display at least a portion of a plurality of input keys included in a QWERTY keyboard layout and omit a remaining portion, by alternately displaying one of a plurality of alphabetic characters arranged sequentially in the QWERTY keyboard layout and omitting another.

ADVANTAGEOUS EFFECTS OF INVENTION

In devices that provides a keyboard layout through a display of a limited size, for example, in a touch input based devices such as smart phones, although a relatively fewer number of input keys are provided, a user may use the devices intuitively without inconvenience.

Since a fewer number of input keys are displayed directly, a size of an individual input key may be relatively enlarged and thus, a possibility of typographical errors occurring may be reduced greatly.

An inconvenience of having to press a mode switch key or a shirt key, or switch a mode for inputting a numeral or a special character may be eliminated.

Fast mode switching may be possible since there may be no need to press a mode switch button a number of times for keyboard language change or mode switching between a special character and an emoticon, and the like.

BEST MODE FOR CARRYING OUT THE INVENTION

Figure 1:
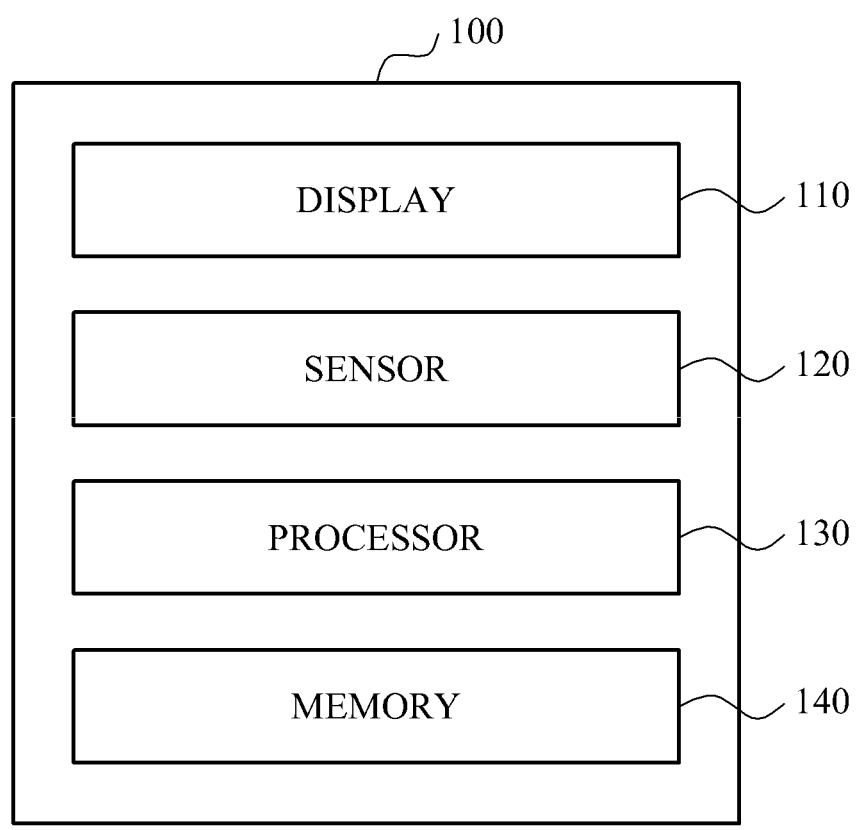
FIG. 1 is a block diagram illustrating an apparatus for providing a user interface (UI) according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an apparatus 100 for providing a user interface (UI) according to an embodiment of the present invention.

A display 110, as a graphical user interface (GUI), may display keyboard layouts according to embodiments of the present invention.

A sensor 120 may sense a user input with respect to a keyboard layout, for example, a touch input, a drag input, and the like.

According to an embodiment of the present invention, in industrial applications, the display 110 and the sensor 120 may be implemented using touch panels currently available on the market. Hereinafter, although the display 110 and the sensor 120 may be mentioned separately, the display 110 and the sensor 120 may not be physically separated components.

A processor 130 may control the display 110 to display the keyboard layouts according to embodiments of the present invention, and receive a result of the sensing performed by the sensor 120 and perform a series of operations for determining a current input value corresponding to the user input.

A memory 140 may store at least one keyboard layout, and the processor 130 may read a specific keyboard layout among the keyboard layouts stored in the memory 140, as necessary.

In addition, the memory 140 may function as a temporary storage space, for example, a cache or a main memory, of the processor 130, during the process of determining the current input value by the processor 130.

A detailed operation of the apparatus 100 for providing a UI and the keyboard layouts according to embodiments of the present invention will be further described with reference to FIG. 2 and subsequent drawings.

Figure 2:
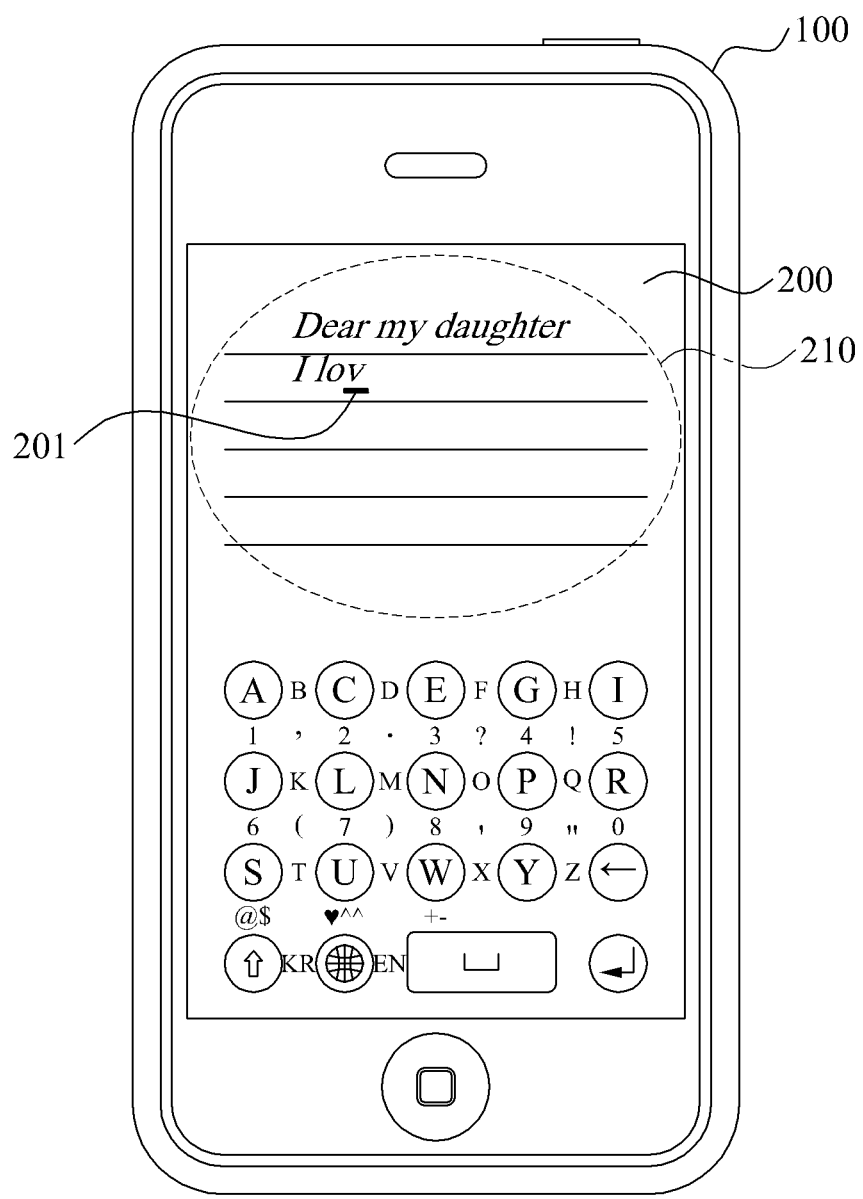
FIG. 2 is a diagram illustrating an ACEGI™ keyboard layout provided by an apparatus for providing a UI according to an embodiment of the present invention.

FIG. 2 is a diagram illustrating an ACEGI™ keyboard layout provided by the apparatus 100 for providing a UI according to an embodiment of the present invention.

As illustrated, the ACEGI™ keyboard layout may be displayed in a form of a GUI through a touch panel 200. As described with reference to FIG. 1, the touch panel 200 may include the display 110 and the sensor 120 of the apparatus 100 for providing a UI. Hereinafter, keyboard layouts will be described.

Herein, two exemplary keyboard layouts, ACEGI™ and QETUO™, are suggested.

The ACEGI™ keyboard layout will be described with reference to FIGS. 2 through 6, and the QETUO™ keyboard layout will be described with reference to FIGS. 7 and 8.

However, the two keyboard layouts are provided as exemplary applications for a better understanding of the present invention. As such, changes made by those of ordinary skill in the art without departing from the principles and spirit of the invention should be construed as not being excluded from the scope of the present invention.

The ACEGI™ and QETUO™ keyboard layouts according to embodiments of the present invention may solve inconveniences of conventional keyboard layouts provided by mobile communication devices, for example, a smart phone or a tablet personal computer (PC).

In general, in such devices, it is difficult to apply a current QWERTY keyboard to a 3 to 4-inch mobile display environment.

Since keys corresponding to the 26 alphabetic characters from A to Z, a space key or a space bar, a backspace key, and several execution keys are to be displayed on a small screen, a size of an individual input key may be overly small and the input keys may be closely spaced. Thus, an adult male or a person of western descent having relatively wide fingers should be wary of making typographical errors. Nonetheless, typographical errors may occur rather frequently.

In reality, in a case of a QWERTY keyboard layout adopted for devices produced by Apple™, among recently popularized smart phones, 10 input keys from Q to P are provided in a first row, 9 input keys from A to L are provided in a second row, and 7 keys from Z to M, a shift key and a backspace key are provided in a third row. An overlay great number of small-sized input keys are densely provided.

A common user inputting text in English may be acutely aware that B is placed between A and C, and D is placed between C and E, among the alphabetic characters.

Accordingly, based on such intuitive awareness, by actually displaying input keys corresponding to A, C, E and not displaying, for example, omitting, input keys corresponding to B and D, in the keyboard layout, a number of input keys to be displayed at a time may be halved.

According to an embodiment of the present invention, as illustrated in FIG. 2, a keyboard layout may be provided in a form of a matrix. A, C, E, G, and I keys may be provided in a first row of the matrix, J, L, N, P, and R keys may be provided in a second row, and S, U, W, and Y keys and a backspace key may be provided in a third row. Such a keyboard layout may be referred to as the ACEGI™ keyboard layout.

A user may touch the displayed A input key to input a character A, touch the displayed C input key to input a character C, and use a combinational input of the displayed A input key and the displayed C input key to input a character B.

The combinational input may be implemented using various schemes. As a simplest scheme for input of the character B, the A input key and the C input key may be touched simultaneously, or the A input key may be dragged toward the C input key while the A input key is being touched.

In this example, a direction in which the dragging is performed may not be of significance. When the A input key is dragged toward the C input key while the A input key is being touched, or conversely, when the C input key is dragged toward the A input key while the C input key is being touched, an identical result may be obtained. The foregoing example may be applicable to both left-handed and right-handed users.

In addition, the combinational input may include an example in which the A input key may be pushed or flicked toward the C input key, and other various examples. In a case in which an input key is flicked, when the A input key is flicked toward the C input key, or when the C input key is flicked toward the A input key, an identical result may be obtained.

In visually expressing a drag input or a flick input corresponding to such a combinational input, an interface may be designed so that the A input key may or may not be actually moved toward the C input key in response to the drag input from the user.

Furthermore, the combinational input may not be limited to an example between neighboring keys, for example, the A input key and the C input key of FIG. 2. A combination of input keys in which the combinational input is possible may be construed as a pair of different arbitrary input keys.

Through the process described above, for example, in a keyboard layout including n input keys (n being a natural number greater than or equal to "2"), $nC_2$ or $nP_2$ combinational inputs may be possible. Here, $nC_2$ denotes that a combinational input of two arbitrary input keys, among the n input keys, may be input irrespective of sequence, and C is a special mathematical character denoting combination.

$nP_2$ denotes that a combinational input of two arbitrary input keys, among the n input keys, may be input in consideration of a sequence, and P is a special mathematical character denoting permutation.

As described above, the combinational input may be possible between non-neighboring input keys. Such an example may bring about effects of reducing a number of input keys to be actually displayed and/or diversifying input values to be provided using the combinational input.

Examples of a combinational input and a process of determining such a combinational input by the processor 130 will be described in detail with reference to FIGS. 3 through 5.

Referring back to FIG. 2, a case in which a user inputs a character V to a position of a cursor 201 included in a text entry application portion 210 will be described.

The user inputting a text "Dear my daughter, I love you" needs to input a character V to the current position of the cursor 201. The user may be intuitively aware that the character V is placed between a character U and a character W according to an alphabetical order. The user may perform a combinational input of touching a U input key and dragging the U input key to a position of a W input key, touching the U input key and pushing the U input key toward the W input key, or touching the U input key and flicking the U input key toward the W input key.

The processor 130 of the apparatus 100 for providing a UI may determine the character V, rather than the character U or W, to be a current input value corresponding to the user input.

Similarly, when the user desires to input a character M, the user may perform a combinational input of an L input key and an N input key disposed in a second row.

In this example, five keys, A, C, E, G, and I, may be provided in a first row in which 10 keys would be provided in an existing QWERTY keyboard layout, and 5 or 4 keys may be provided in the second row and a third row.

Thus, a remarkable decrease may be achieved in a possibility of typographical errors occurring when a touch input is provided.

The ACEGI™ keyboard layout may have advantages in that many keys of frequently used characters may be displayed directly, and keys of relatively less used characters may not be displayed.

Research on the frequency of the letters of the English alphabet exists. In the research, an analysis of the letters occurring in the words listed in the main entries of the Concise Oxford Dictionary, 11th edition revised, 2004, published by Oxford University Press, was conducted. According to the analysis, among the 26 characters from A to Z, the frequency of E corresponds to 11.1607%. The analysis is available on the Oxford dictionary website (http://www.oxforddictionaries.com/page/133).

Table 1 shows the result of the analysis provided on the website.

TABLE 1

| Character | Frequency percentage | Proportion to 'Q' |
|---|---|---|
| E | 11.16% | 56.88 |
| A | 8.50% | 43.31 |
| R | 7.58% | 38.64 |
| I | 7.54% | 38.45 |
| O | 7.16% | 36.51 |
| T | 6.95% | 35.43 |
| N | 6.65% | 33.92 |
| S | 5.74% | 29.23 |
| L | 5.49% | 27.98 |
| C | 4.54% | 23.13 |
| U | 3.63% | 18.51 |
| D | 3.38% | 17.25 |
| P | 3.17% | 16.14 |
| M | 3.01% | 15.36 |
| H | 3.00% | 15.31 |
| G | 2.47% | 12.59 |
| B | 2.07% | 10.56 |
| F | 1.81% | 9.24 |
| Y | 1.78% | 9.06 |
| W | 1.29% | 6.57 |
| K | 1.10% | 5.61 |
| V | 1.01% | 5.13 |
| X | 0.29% | 1.48 |
| Z | 0.27% | 1.39 |
| J | 0.20% | 1 |
| Q | 0.20% | 1 |

According to Table 1, when the ACEGI™ keyboard layout is provided according to an embodiment of the present invention, a sum of frequencies of A, C, E, G, I, J, L, N, P, R, S, U, W, and Y to be displayed may be 69.73%.

When a keyboard layout including 14 keys corresponding to 53.84% of the 26 characters is displayed, an expected hitting rate of a single touch input to enter an arbitrary word may correspond to 69.73%, which shows a high efficiency of the ACEGI™ keyboard layout.

The ACEGI™ keyboard layout may provide 5 input keys in a row and enable an intuitive and errorless input, rather than arranging, at most, 10 input keys in a row on a mobile display of a limited size, similar to an existing QWERTY scheme.

When such a combinational input is applied to not only between input keys neighboring in a horizontal direction but also between input keys neighboring in a vertical direction, and/or between input keys neighboring a diagonal direction, an input value that may be input through the combinational input may be extend greatly.

For example, in the ACEGI™ keyboard layout according to an embodiment of the present invention, 10 Arabic numerals may be input through 5 columns and 3 rows.

When a combinational input of the A input key and a J input key neighboring in a vertical direction is input, an Arabic numeral "1" may be determined to be a current input value.

Since separate mode switching for inputting an Arabic numeral may be unnecessary, the user may enter numerals quickly.

In addition, in a case of a combinational input of two input keys neighboring in a diagonal direction, a special character such as a frequently used punctuation mark may be determined to be the current input value.

In particular, when the user desiring to input a comma provides a combinational input of the A input key and the L input key, or provides a combinational input of the C input key and the J input key, the processor 130 may determine the comma to be the current input value.

In this example, a sequence or a directionality of the combinational input of the A input key and the L input key may not be significant. In addition, a sequence or a directionality of the combinational input of the C input key and the J input key may not be significant.

The user may input a comma by dragging or flicking, in an arbitrary sequence/direction, two arbitrary input keys neighboring in a diagonal direction, among the A input key, the C input key, the L input key, and the J input key.

FIG. 2 illustrates, based on such examples, a configuration in which, a character not displayed and omitted may be input when a combinational input of two input keys neighboring in a horizontal direction is provided, a numeral key may be input when a combinational input of two input keys neighboring in a vertical direction is provided, and a special character such as a punctuation mark may be implemented when a combinational input of two input keys neighboring in a diagonal direction is provided.

Characters having no corresponding input keys, for example, B and D, may be displayed to provide a user with tips for combinational inputs. The portions in which the characters B and D are displayed may be simple images which may not perform an input function.

Depending on an example, the characters having no corresponding input keys, for example, B and D, may not be displayed and omitted, based on user settings, to increase a simplicity of a screen configuration. Such an example will be further described with reference to FIG. 6.

According to an embodiment of the present invention, a space key, a backspace key, an up or down cursor movement key (an arrow), and the like may be implemented by extended applications of the combinational input.

For example, when the user touches an arbitrary input key disposed on the touch panel 200 and drags the input key to a position of a second input key from the input key to a right side, the processor 130 may determine the space key to be the current input value.

When the user touching an A input key drags the A input key through a C input key to a position of an E input key, the space key may be determined to be input. Also, when the user touches an L input key and drags the L input key through an N input key to a P input key, the space key may be determined to be input.

As described above, by determining the space key to be the current input value when a combinational input is provided by dragging at least three input keys neighboring in a horizontal direction at an arbitrary position to the right side, the user may simply input the space key using a finger motion while inputting alphabetic characters, without a touch of an actually displayed space key.

Similarly, when a combinational input is provided by dragging at least three keys neighboring in a horizontal direction to a left side, a backspace key may be determined to be input.

By applying the foregoing, when a combinational input of at least three input keys is provided in an upper direction, the cursor 201 may be determined to be moved to an upper row. When a combinational input of at least three input keys is provided in a lower direction, the cursor 201 may be determined to be moved to a lower row.

However, depending on a linguistic and cultural practices of a region, a text may be written from right to left, or from up to down.

As a modified example, a combinational input of at least three input keys corresponding to a writing direction may be used as a space key, and a combinational input of at least three input keys corresponding to an opposite direction may be used as a backspace key.

According to an embodiment of the present invention, mode switching may be performed simply using a combinational input of adjacent input keys and a mode exchanging key or a global key disposed between a shift key and a space key. The mode exchanging key may be similar to a Korean/English switching key of the standard 106-key keyboard.

In general, a plurality of keyboard layouts, for example, a Korean keyboard, an English keyboard, a special character keyboard, an emoticon keyboard, and the like, may be stored. In order to switch among the keyboard layouts, the user may need to touch the mode exchanging key repeatedly until a desired keyboard layout is displayed.

For example, when a keyboard layout rotates in a sequence of a Korean keyboard, an English keyboard, a Japanese keyboard, a first special character keyboard, a second special character keyboard, an emoticon keyboard, and the Korean keyboard again, the user may need to touch the mode exchanging key five times to use the emoticon keyboard while using the Korean keyboard.

To alleviate such inconveniences in devices, for example, an iPhone of Apple, a plurality of keyboards may be displayed in a form of a pop-up window by touching and holding the mode exchanging key, and the user may move a finger to a desired keyboard on the pop-up window while keeping the finger on a display. However, according to an embodiment of the present invention, such mode switching may be performed by dragging or flicking the mode exchanging key directly toward one of an adjacent S input key, a U input key, a W input key, a shift input key, and a space input key.

When the mode exchanging key is dragged or flicked toward the U input key while a Korean keyboard is in use, the user may jump to an emoticon, whereby an unnecessary rotation process may be omitted.

Figure 3:
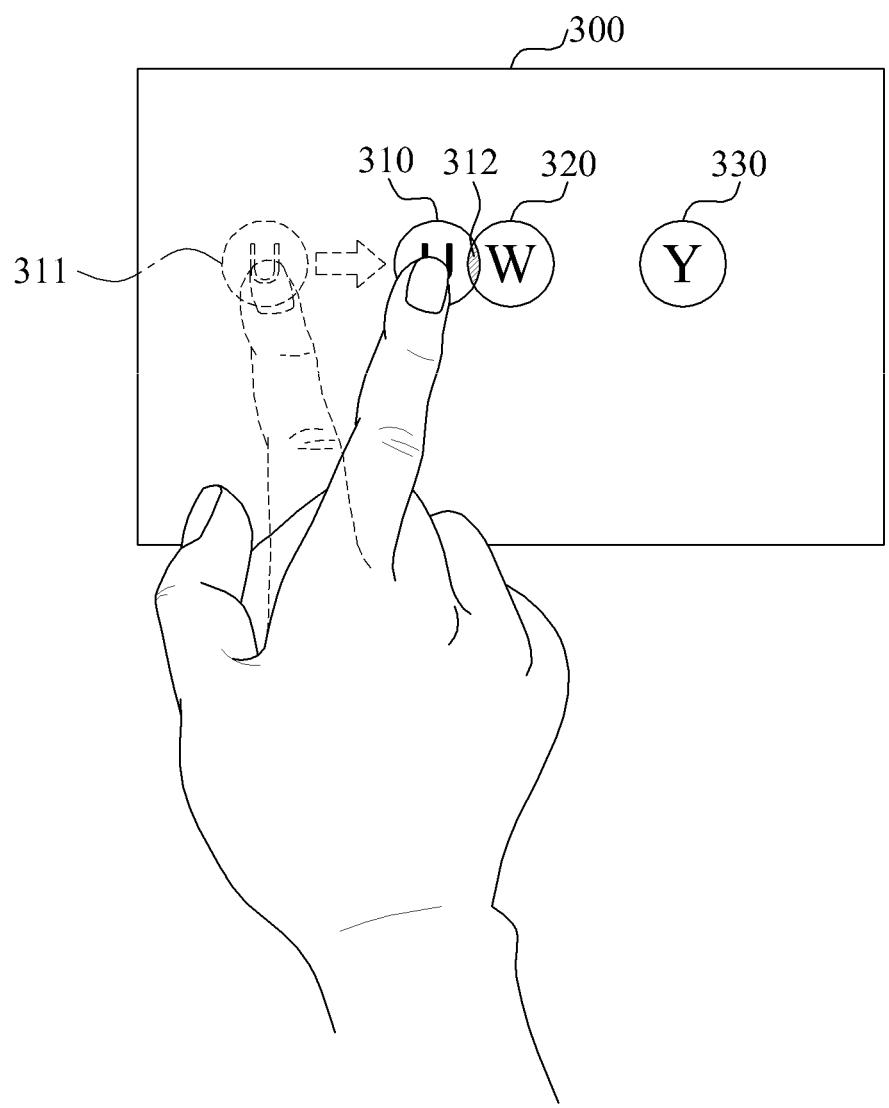
FIG. 3 is a diagram illustrating a process of determining a current input key by sensing a combinational input between input keys according to an embodiment of the present invention.

FIG. 3 is a diagram 300 illustrating a process of determining a current input key by sensing a combinational input between input keys according to an embodiment of the present invention.

When a user touches an original position 311 of a U input key 310 and drags the U input key 310 toward a W input key 320, the U input key 310 may be moved in response to the drag performed by a finger of the user.

When the U input key 310 is positioned at a distance less than a preset threshold from the W input key 320, the processor 310 may determine a current user input to be a combinational input for inputting a character V, rather than a single input of a character U or W.

The threshold may be set, for example, to about 20% of a distance between actually displayed individual keys.

In this example, in particular, the process of determining a combinational input, although the U input key 310 and the W input key 320 do not overlap, it may be determined that the combinational input occurs when the U input key 310 is pushed toward the W input key 320 to be positioned at a distance less than the threshold from the W input key 320.

However, according to another embodiment of the present invention, when an area of a portion 312 in which the U input key 310 and the W input key 320 overlap is greater than or equal to another preset threshold, the processor 130 may determine a current user input to be a combinational input for inputting the character V, rather than a single input of a character U or W.

Accordingly, embodiments of the present invention may include an example in which conditions of the combinational input are set to be satisfied when a distance between individual keys is less than or equal to a predetermined threshold, and an example in which conditions of the combinational input are set to be satisfied when an area of a portion in which the individual input keys overlap is greater than or equal to a predetermined area.

Although FIG. 3 illustrates the latter example, examples not illustrated in FIG. 3 are not to be construed as excluded.

When the user continuously drags the U input key 310 through the W input key 320 to a position of a Y input key 330 such that an area of a portion in which the U input key 310 and the Y input key 330 overlap is greater than or equal to the threshold, the processor may determine a space key to be the current input key, as described with reference to FIG. 2.

Figure 4:
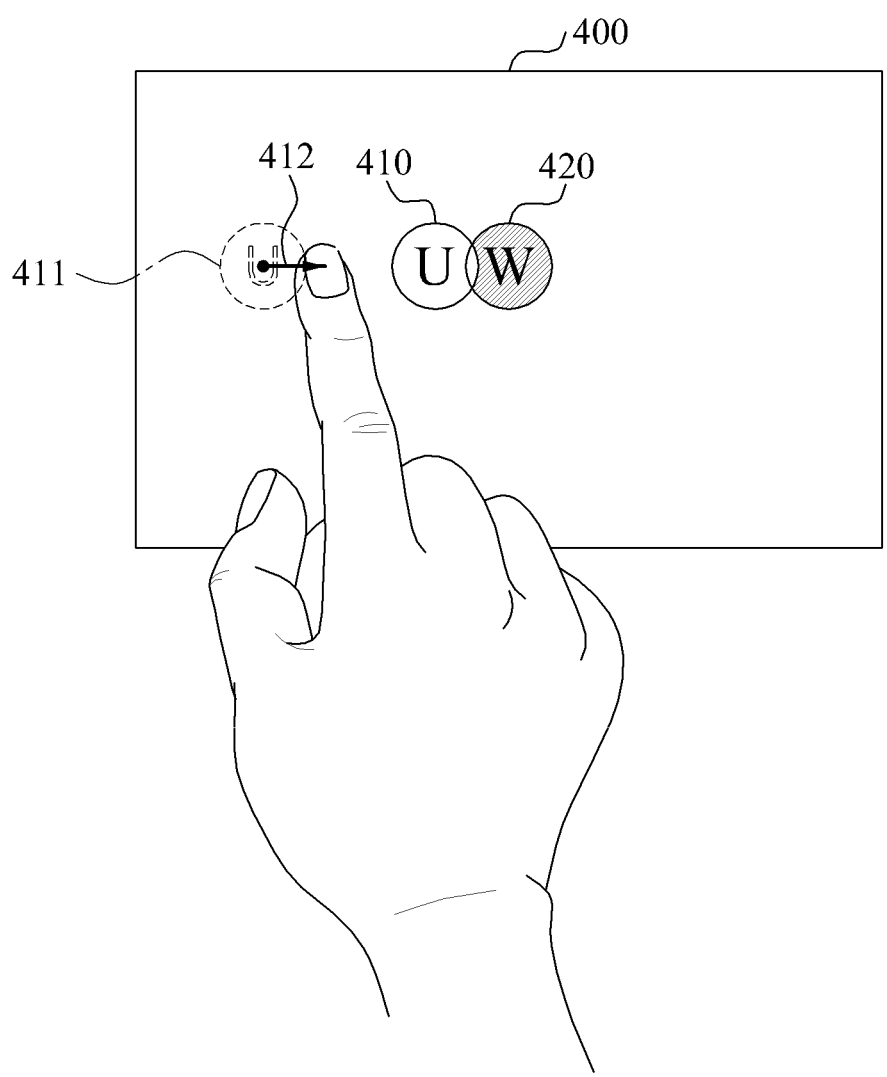
FIG. 4 is a diagram illustrating a process of determining a current input key by sensing a combinational input between input keys according to another embodiment of the present invention.

FIG. 4 is a diagram 400 illustrating a process of determining a current input key by sensing a combinational input between input keys according to another embodiment of the present invention.

A difference between the present embodiment and the embodiment described with reference to FIG. 3 may be in that a user may not need to continuously drag a U input key 410 to a position of a W input key 420 for the U input key 410 and the W input key 420 to overlap, but may touch the U input key 410 and flick the U input key 410 toward the W input key 420, similar to flicking an object in a game.

In this example, the processor 130 may determine a combinational input using one of at least two determining methods.

In one determining method, the U input key 410 may be actually moved in a direction of a vector 412 determined based on a user motion after a position 411 of the U input key 410 is touched. As described with reference to FIG. 3, when an area of a portion in which the U input key 410 and the W input key 420 overlap is greater than or equal to the threshold, a current user input may be determined to be a combinational input for inputting a character V, rather than a single input of a character U or W. However, when a magnitude of the vector 412 is overly small and does not reach a threshold corresponding to a preset minimum magnitude, the current user input may be determined to be a single input of the U input key 410.

In another determining method, the vector 412 may be calculated based on a user motion of flicking the U input key 410 after touching the position 411 of the U input key 410, an input key most adjacent to a direction of the vector 412 may be determined to be a target to be combined with the U input key 410, and the current user input may be determined to be the combinational input for inputting the character V.

When the N input key of FIG. 2 is closer to the direction of the vector 412 than the W input key 420 is, the processor 130 may determine a current input value to be a parenthesis ")".

Such a case may be limited to a case in which the magnitude of the vector 412 is greater than or equal to the threshold corresponding to the preset minimum magnitude. Such a limitation may prevent an intended minute drag from causing an undesired combinational input when the user touches a key for a single input and moves to a subsequent key.

Furthermore, in other embodiments of the present invention in which a combinational input of two input keys not neighboring each other is possible, vector calculation may be unnecessary.

In particular, it may be determined that a combinational input occurs when the position 411 at which a touch input of the user is initiated corresponds to an area of the U input key 410, and a position at which the touch input of the user is terminated corresponds to an area of the W input key 420 after a drag occurs while the touch input of the user is maintained.

The foregoing example may be useful when a combinational input of two non-neighboring keys, distant from each other, is to be provided. For example, irrespective of a travel path or a direction of a drag, when a touch and drag input is initiated in an area of a first input key and terminated in an area of a second input key, it may be determined that a combinational input of the first input key and the second input key is provided.

Figure 5:
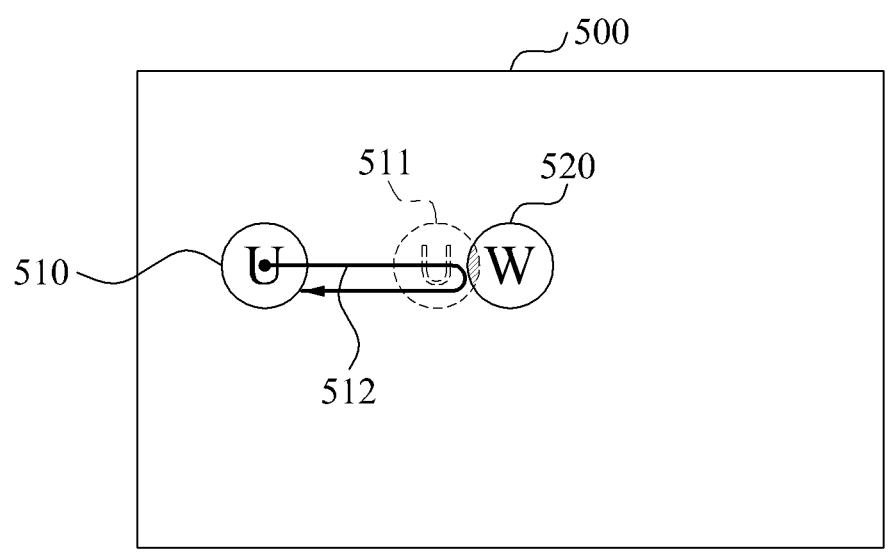
FIG. 5 is a diagram illustrating a process of undoing a combinational input between input keys by a user according to an embodiment of the present invention.

FIG. 5 is a diagram 500 illustrating a process of undoing a combinational input between input keys by a user according to an embodiment of the present invention.

Depending on a case, a user may inadvertently provide a combinational input of a U input key 510 and a W input key 520. In such a case, the processor 130 may determine a character V to be a current input value to complete the user input, and the user may delete the character V using a backspace. However, the user may experience an inconvenience.

According to an embodiment of the present invention, when the user performs a drag and returns along a path 512 in an opposite direction, the processor 130 may cancel an input of the character V, whereby a character may not be input.

In this example, although the user inadvertently drags the U input key 510 to a position 511 such that an area of a portion in which the U input key 510 and the W input key 520 overlap is greater than or equal to a threshold, the processor 130 may not perform a combinational input when the user adjusts the area to be less than the threshold, rather than terminating a touch and removing a finger in the situation.

In graphics, the character V may be displayed to fade in, and displayed to fade out when the user input is canceled. Such a visual animation effect may vary, and any variation made without departing from the principles and spirit of the invention should be construed as not being excluded from the scope of the present invention.

Figure 6:
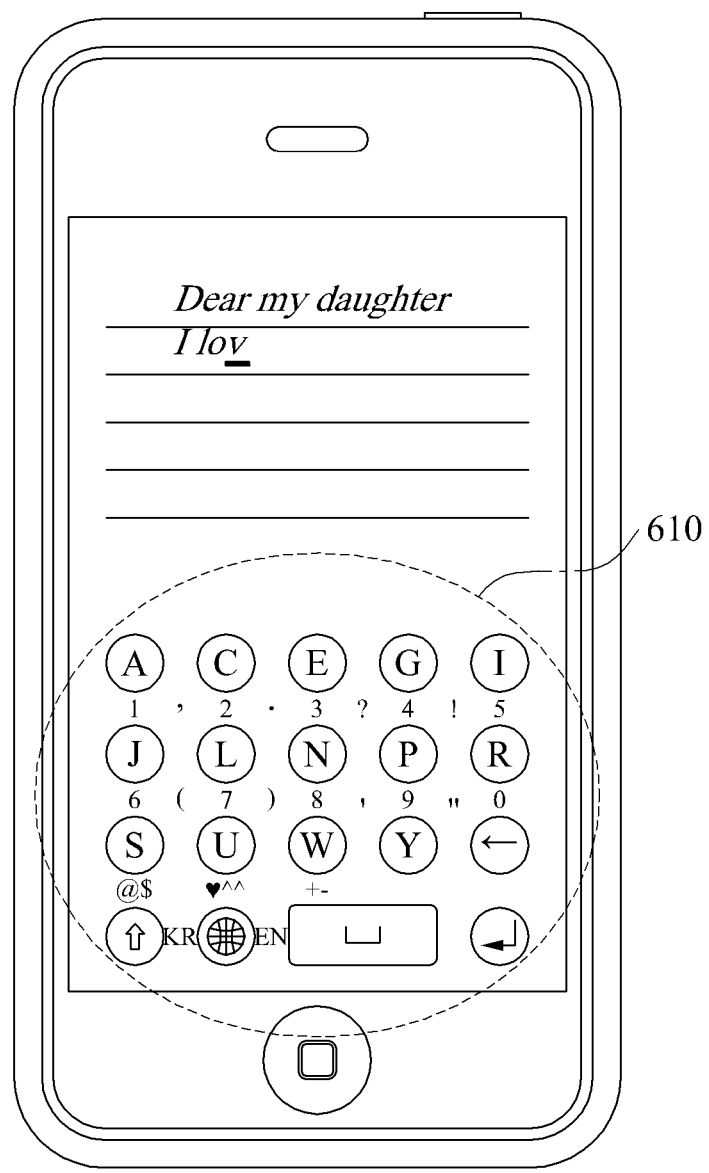
FIG. 6 is a diagram illustrating a variation of an ACEGI™ keyboard layout according to another embodiment of the present invention.

FIG. 6 is a diagram 600 illustrating a variation of an ACEGI™ keyboard layout 610 according to another embodiment of the present invention.

In FIG. 2, characters to be combined by a combinational input (to which actual input keys are not assigned) are displayed between displayed input keys using a small font, considering that a user may not be familiar with a new keyboard layout, or that a user may not be intuitively aware of an order of alphabetic characters.

However, there may be a user who dislikes such a complex screen configuration. Accordingly, depending on user settings, the keyboard layout 610, in which tips on results of combinational inputs are not displayed and omitted, as shown in FIG. 6, may be provided.

Based on additional user settings, numerals or punctuation marks may not be displayed and omitted.

Furthermore, various keyboard layouts provided to a user throughout the entire disclosure may be customized using different user settings with respect to a portion of combinations.

An example of an ACEGI™ keyboard layout is described in the foregoing. However, since, depending on a user, a conventional QWERTY keyboard layout may be preferred to the ACEGI™ keyboard layout, an example in which the spirit of the present invention is applied to the existing QWERTY keyboard layout will be described with reference to FIGS. 7 and 8.

Figure 7:
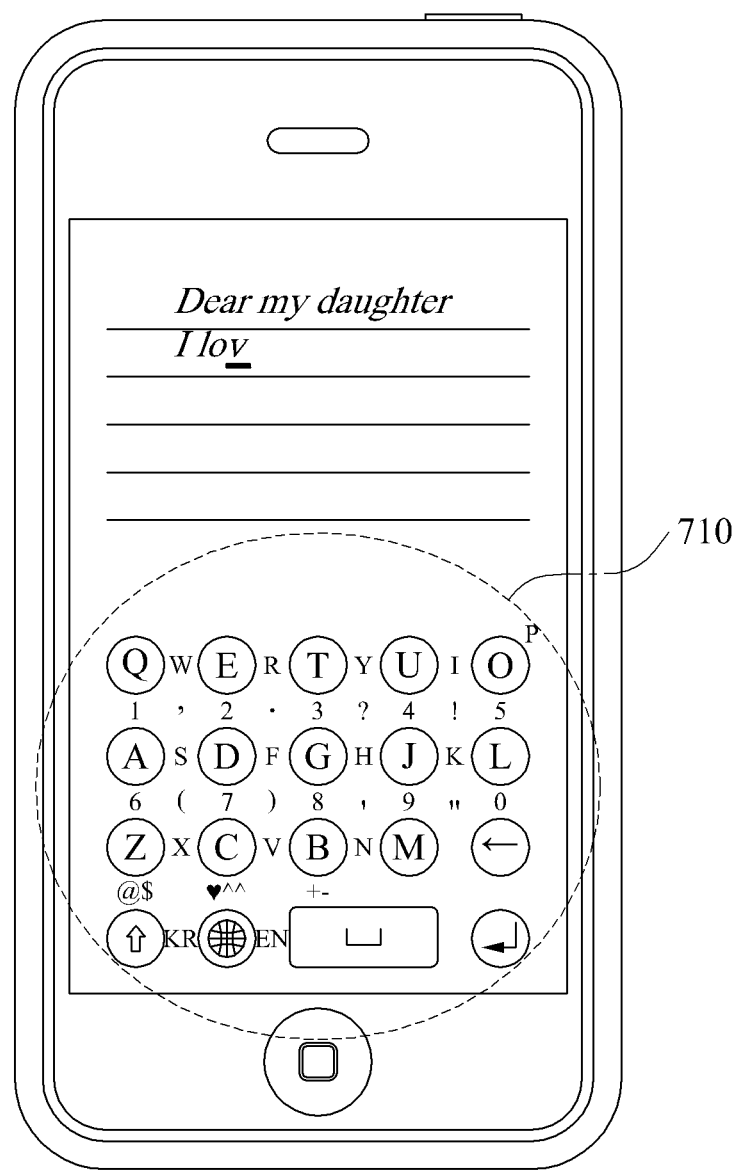
FIG. 7 is a diagram illustrating a QETUO™ keyboard layout provided by an apparatus for providing a UI according to an embodiment of the present invention.

FIG. 7 is a diagram 700 illustrating a QETUO™ keyboard layout 710 provided by an apparatus for providing a UI according to an embodiment of the present invention.

The QETUO™ keyboard layout 710 may differ from an ACEGI™ keyboard layout in that characters may be arranged in an order of arrangement of characters in the conventional QWERTY keyboard layout, rather than an alphabetical order.

In the QWERTY keyboard layout, Q, W, E, R, T, Y, U, I, O, and P are arranged in a first row, A, S, D, F, G, H, J, K, and L are arranged in a second row, and Z, X, C, V, B, N, and M are arranged in a third row.

In the QETUO™ keyboard layout 710, input keys corresponding to characters Q, E, T, U, and O may be arranged in a first row, and input keys may not be assigned to characters W, R, Y, I, and P. The characters W, R, Y, I, and P may be input by the combinational input described above.

For example, when a combinational input of a Q input key and an E input key is provided, the character W may be input. In order to input a character V, a combinational input of a C input key and a B input key may be provided.

In the first row of the QETUO™ keyboard layout 710, the character P may be input using a combinational input of an O input key and a blank by pushing the O input key toward a boundary of a display.

The foregoing combinational input corresponds to a conceptual combinational input. When the O input key is dragged or flicked toward the boundary, the processor 130 may determine that the combinational input corresponds to an input of the character P.

When another character is input by moving an input key positioned at an edge of the display toward the outer boundary, languages of many European countries, for example, Russia, including characters other than 26 Roman alphabet characters may be covered by example embodiments of the present invention.

Figure 8:
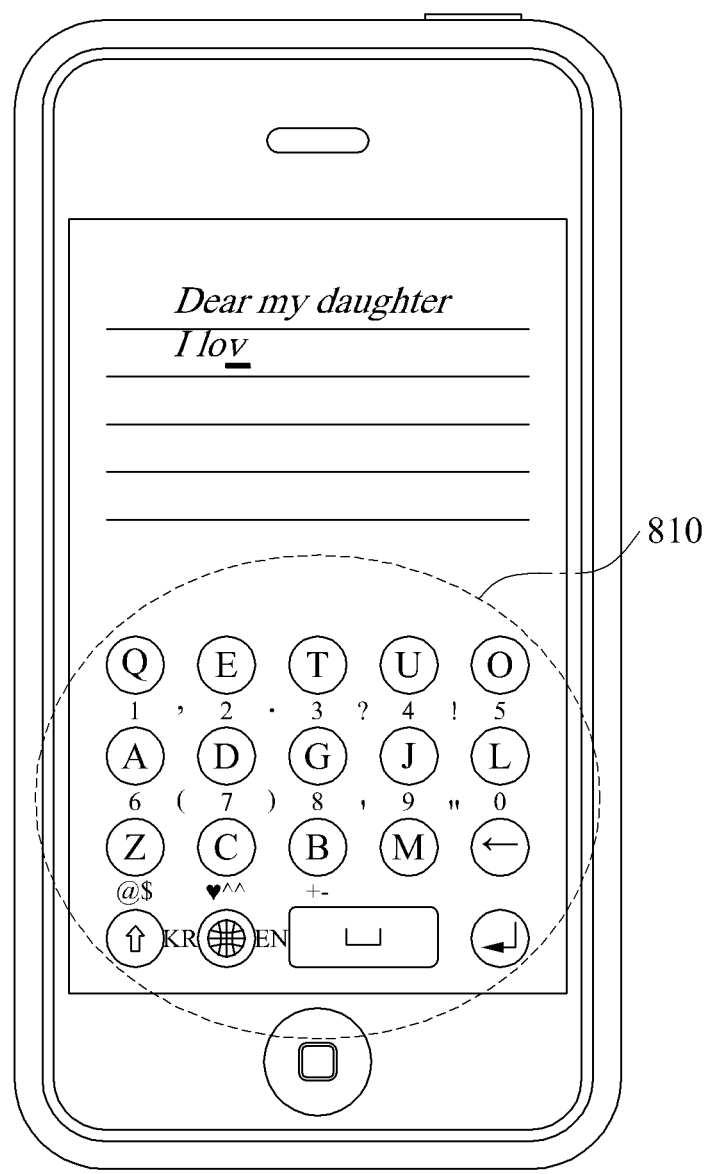
FIG. 8 is a diagram illustrating a variation of a QETUO™ keyboard layout according to another embodiment of the present invention.

FIG. 8 is a diagram 800 illustrating a variation of a QETUO™ keyboard layout 810 according to another embodiment of the present invention.

Similar to the example of the ACEGI™ keyboard layout of FIG. 6, in the QETUO™ keyboard layout 810, a portion of results of combinational inputs may be omitted, whereby a simplicity may increase.

Similar to the description provided with reference to FIG. 6, depending on user settings, other keys, for example, numerals, special characters, and the like, may be omitted, and an arrangement of a portion of input keys may be changed.

Figure 9:
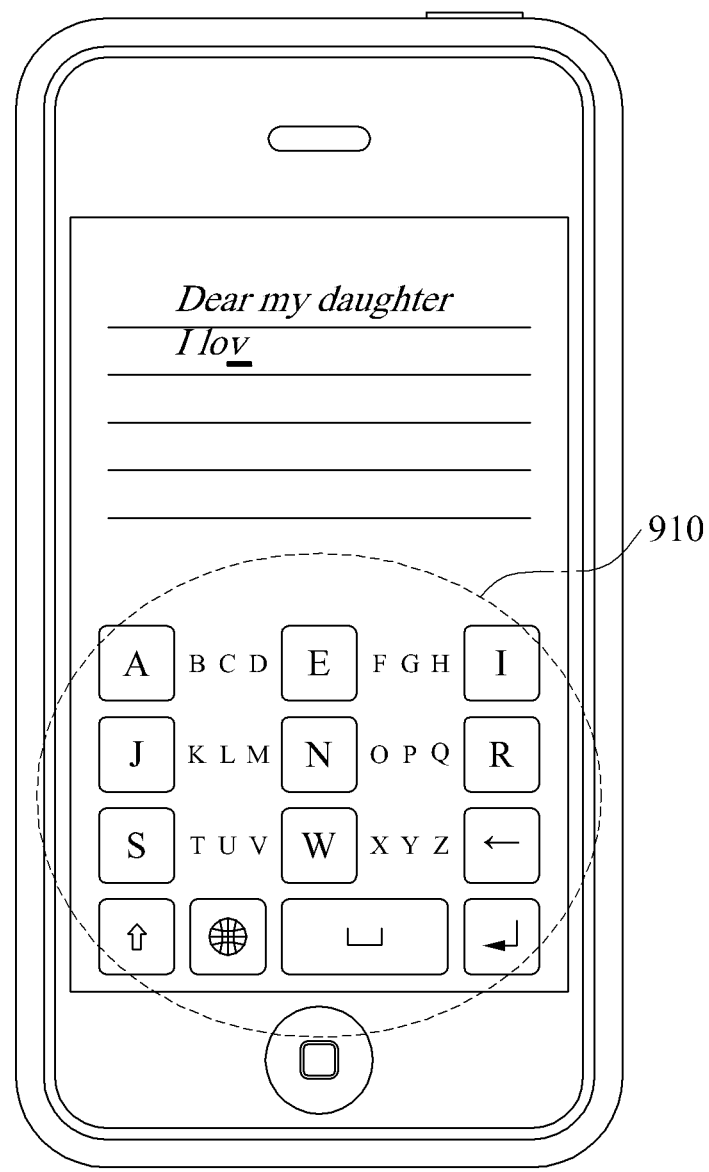
FIG. 9 is a diagram illustrating an ACEGI™ keyboard layout according to still another embodiment of the present invention.

FIG. 9 is a diagram 900 illustrating an ACEGI™ keyboard layout 910 according to still another embodiment of the present invention.

In contrast to the examples of FIGS. 2 and 6, the ACEGI™ keyboard layout may be varied to the simpler keyboard layout 910.

When compared to the keyboard layout 610 of FIG. 6, a number of columns in the keyboard layout 910 is reduced from 5 to 3.

In this example, in order to input a character B, an A input key may be pushed toward an E input key. In order to input a character D, the E input key may be pushed toward the A input key.

In order to input a character C, the A input key may be pushed to a position of an I input key to provide a combinational input. In this example, the character C may be input using a combinational input of the A input key and the I input key.

In order to input a character F, the E input key may be pushed toward the I input key. In order to input a character H, the input key I may be pushed toward the E input key.

In order to input a character G, the I input key may be pushed to a position of the A input key to provide a combinational input. In this example, the character G may be input using a combinational input of the I input key and the A input key. The combinational input for inputting the character C and the combinational input for inputting the character G may be provided in opposite directions.

Using a scheme described above, combinational inputs with respect to all alphabetic characters may be possible, and a number of keys may be reduced further. Accordingly, a size of individual input keys to be actually displayed may increase further, and a size of a screen may be reduced further.

Figure 10:
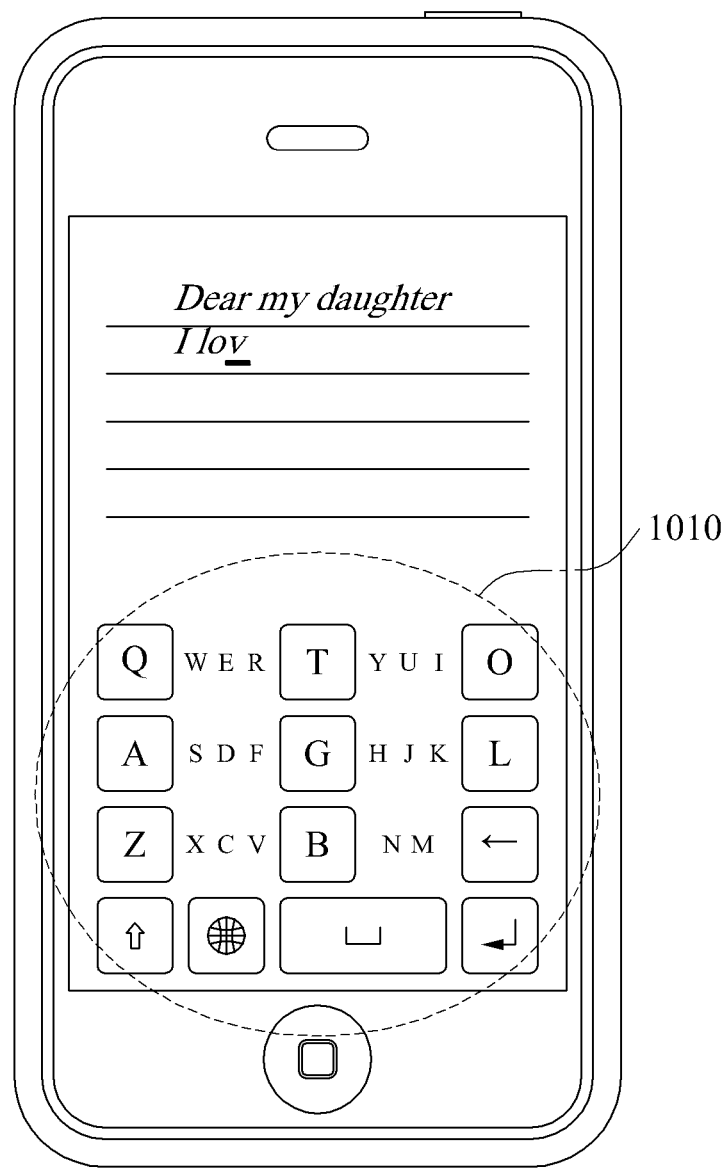
FIG. 10 is a diagram illustrating a QETUO™ keyboard layout according to still another embodiment of the present invention.

FIG. 10 is a diagram 1000 illustrating a QETUO™ keyboard layout 1010 according to still another embodiment of the present invention.

The example of FIG. 9 corresponds to a simplified ACEGI™ keyboard layout, and the keyboard layout 1010 corresponds to a simplified QETUO™ keyboard layout.

A basic combinational input scheme of the example of FIG. 9 may be applicable.

A character P is disposed on a right side of an O input key. As described with reference to FIG. 7, the character P may be input by pushing the O input key toward a margin on a right side.

As described with reference to FIG. 2, according to an example embodiment of the present invention, a combinational input may not occur only between neighboring input keys, but may occur by selecting an arbitrary pair of displayed input keys.

For example, in a keyboard layout including n input keys (n being a natural number greater than or equal to "2"), $nC_2$ or $nP_2$ combinational inputs may be possible.

Combinational inputs other than a combinational input of actual input keys may also be possible. An input value may be determined when an input key is pushed toward an outer margin, similar to a case in which the character P is input as shown in FIG. 10. According to various embodiments of the present invention, a large number of input values may be determined, when compared to a number of actually displayed input keys.

Thus, the present invention should not be construed as being limited to a portion of the illustrated keyboard layouts, and other arbitrary embodiments may be possible without departing from the principles and spirit of the invention.

Figure 11:
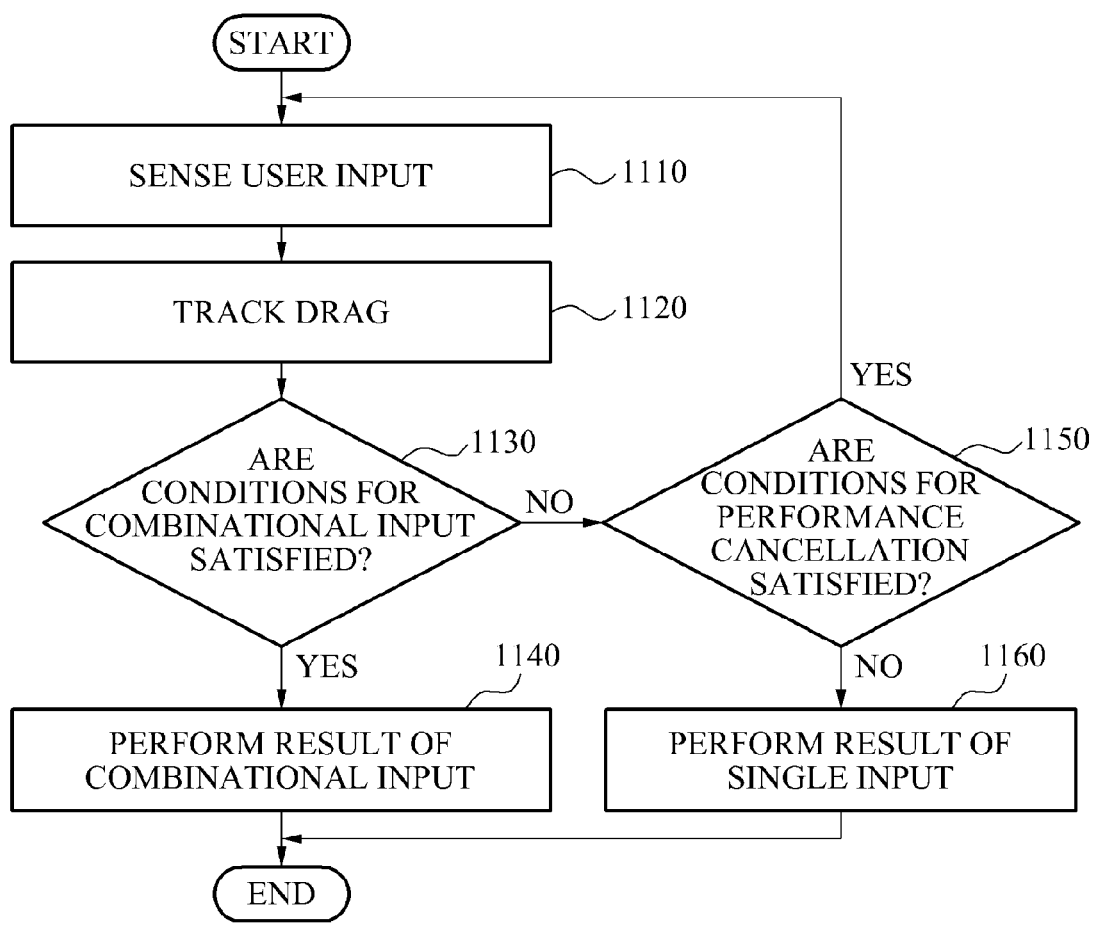
FIG. 11 is a flowchart illustrating a method of providing a UI according to an embodiment of the present invention.

FIG. 11 is a flowchart illustrating a method of providing a UI according to an embodiment of the present invention.

In operation 1110, the sensor 120 of the apparatus 100 for providing an UI may sense a user touch input.

When a user performs a drag input and/or a motion input while the touch input is maintained, the processor 130 may track the drag input and/or the motion input, in operation 1120.

In operation 1130, the processor 130 may determine whether the user input satisfies conditions for a combinational input of at least two input keys. The conditions for the combinational input may include a condition that a distance between an input key moved in response to the user input and another input key is less than a predetermined threshold, a condition that an area of a portion in which the input key and the other input key overlap is greater than another threshold, a condition that a vector corresponding to the user input has a magnitude greater than or equal to a predetermined magnitude, a condition that an input key corresponding to a start of the user touch input differs from an input key corresponding to an end of the user touch input, and the like.

The conditions for the combinational input are described by various embodiments provided with reference to FIGS. 3 and 4.

When the conditions for the combinational input are satisfied, the processor 130 may perform a result of the combinational input, in operation 1140.

The performing of the result of the combinational input may include, depending on targets for the combinational input, determining an omitted character to be a current input value, determining a numeral, a special character including a punctuation mark, and the like to be a current input value, and the like, as described above.

In addition, the performing of the result of the combinational input may include determining a space key, a backspace key, and the like to be a current input value by performing a combinational input of at least three neighboring keys to a right side or a left side, as described above.

FIG. 5 illustrates an example in which the user cancels the combinational input, for example, a user input of returning the input key so that the area of the portion in which the input key and the other input key overlap greater than the threshold may be readjusted to be less than the threshold.

When the conditions for the combinational input are not satisfied in operation 1130, and conditions for performance cancellation are satisfied in operation 1150, the processor 130 may determine that the current input value is absent and wait for a subsequent input value.

When the conditions for the performance cancellation are not satisfied, a result of a single input may be performed, in operation 1160. The single input may refer to a character corresponding to an input key being determined to be the current input value by touching the simple input key, rather than a combinational input.

Figure 12:
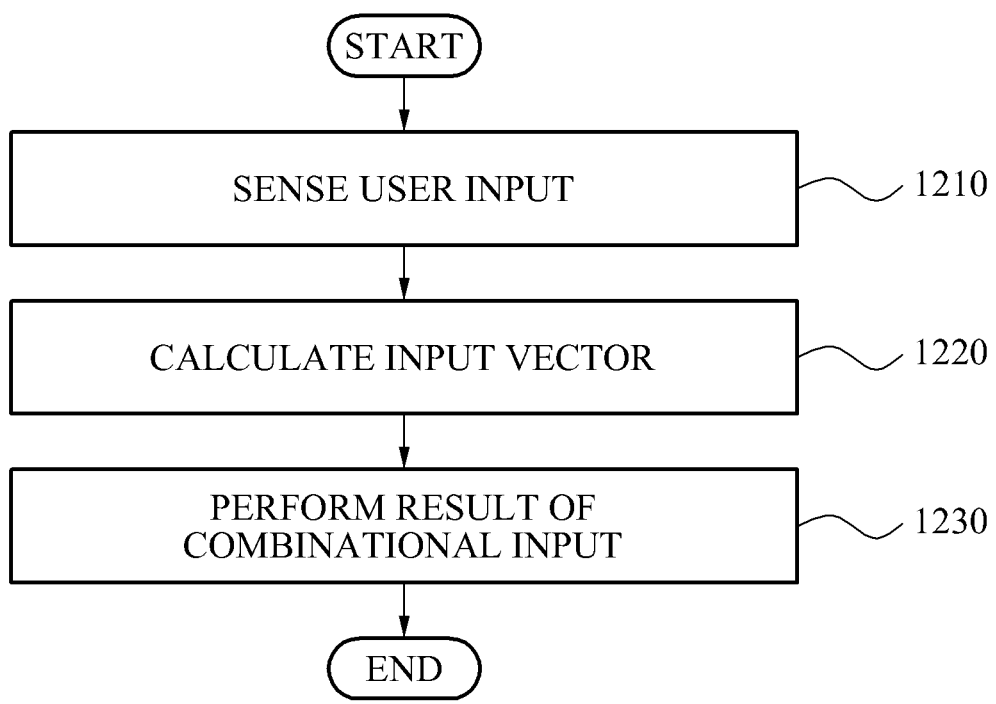
FIG. 12 is a flowchart illustrating a method of providing a UI according to another embodiment of the present invention.

FIG. 12 is a flowchart illustrating a method of providing a UI according to another embodiment of the present invention.

In operation 1210, the sensor 120 may sense a user input. In operation 1220, the processor 130 may calculate a vector corresponding to the user input.

A process of determining a combinational input using input vector calculation has been described with reference to FIG. 4. In operation 1230, the processor 130 may perform a result of the combinational input.

The descriptions provided with reference to FIGS. 1 through 10 may apply to the methods of providing an UI described with reference to FIGS. 11 and 12.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for providing a user interface (UI) providing a keyboard layout, the apparatus comprising:
a display to display a first input key assigned to a first character, and a second input key assigned to a second character differing from the first character;
a sensor to sense a user input with respect to the first input key; and
a processor to determine a third character differing from the first character and the second character to be a current input value corresponding to the user input, when the first input key is moved to a position of the second input key and positioned at a distance less than a preset threshold from the second input key or overlapped with the second input key in response to the user input;
wherein the user input corresponds to an input in which the first input key is dragged after the first input key is touched by the user; and
wherein the third character is displayed at a position between the first input key and the second input key.

2. The apparatus of claim 1, wherein a plurality of input keys provided in the keyboard layout is arranged to form a matrix, and the first input key and the second input key are displayed to be disposed adjacent to each other in an identical row within the matrix.

3. The apparatus of claim 2, wherein:
the display displays a third input key assigned to a fourth character differing from the first character and the second character and disposed adjacent to the first character in an identical column within the matrix, and
the processor determines a first numeral assigned to correspond to positions of the first input key and the third input key to be the current input value corresponding to the user input, when the first input key is moved to a position of the third input key and positioned at a distance less than the threshold from the third input key in response to the user input.

4. The apparatus of claim 2, wherein:
the display displays a fourth input key assigned to a fifth character differing from the first character and the second character and disposed adjacent to the first character in a diagonal direction within the matrix, and
the processor determines a first special character assigned to correspond to positions of the first input key and the fourth input key to be the current input value corresponding to the user input, when the first input key is moved to a position of the fourth input key and positioned at a distance less than the threshold from the fourth input key.

5. The apparatus of claim 1, wherein the processor does not determine the second character or the third character to be the current input value, when the first character is repositioned at a distance greater than or equal to the threshold in response to the user input while the user input is maintained even after the first input key is moved to the position of the second input key and positioned at the distance less than the preset threshold from the second input key in response to the user input.

6. The apparatus of claim 5, wherein the display displays the third character to fade in when the first input key is moved to the position of the second input key and positioned at the distance less than the preset threshold from the second input key in response to the user input, and displays the third character to fade out when the first character is repositioned at the distance greater than or equal to the threshold in response to the user input while the user input is maintained.

7. The apparatus of claim 1, wherein the keyboard layout displays at least a portion of alphabetic characters from A to Z and omits a remaining portion, by alternately displaying one of the alphabetic characters from A to Z and omitting another.

8. The apparatus of claim 1, wherein the keyboard layout displays at least a portion of a plurality of input keys included in a QWERTY keyboard layout and omits a remaining portion, by alternately displaying one of a plurality of alphabetic characters arranged sequentially in the QWERTY keyboard layout and omitting another.

9. The apparatus of claim 1, wherein the processor determines the third character differing from the first character and the second character to be the current input value corresponding to the user input, when the first input key corresponds to an input key positioned at an edge of the display among a plurality of input keys displayed by the display to be adjacent to a boundary of the display and the first input key is moved toward the boundary in response to the user input.

10. An apparatus for providing a user interface (UI) providing a keyboard layout, the apparatus comprising:
a display to display a plurality of input keys included in the keyboard layout;
a sensor to sense a user input with respect to a first input key among the plurality of input keys; and
a processor to determine one of a space key, a backspace key, an up arrow key, and a down arrow key to be a current input value corresponding to the user input, when the first input key is moved through a second input key adjacent to the first input key and positioned at a distance less than a preset threshold from a third input key adjacent to the second input key in an opposite direction of the first input key or overlapped with the second input key;

wherein the user input corresponds to an input in which the first input key is dragged after the first input key is touched by the user;

wherein the current input value is different from a first character for the first input key and a second character for the second input key; and wherein the current input value is displayed at a position between the first input key and the second input key.

11. The apparatus of claim 10, wherein the processor determines the space key to be the current input value corresponding to the user input, when the first input key is disposed on a left side of the third input key within the keyboard layout.

12. The apparatus of claim 10, wherein the processor determines the backspace key to be the current input value corresponding to the user input, when the first input key is disposed on a right side of the third input key within the keyboard layout.

13. The apparatus of claim 10, wherein the processor determines the up arrow key to be the current input value corresponding to the user input, when the first input key is disposed on a lower side of the third input key within the keyboard layout, and determines the down arrow key to be the current input value corresponding to the user input when the first input key is disposed on an upper side of the third input key within the keyboard layout.

14. A method of providing, by a user interface (UI) apparatus, a UI providing a keyboard layout, the method comprising:

displaying, by a display of the UI apparatus, a first input key assigned to a first character, and a second input key assigned to a second character differing from the first character;

sensing, by a sensor of the UI apparatus, a user input with respect to the first input key; and determining, by a processor of the UI apparatus, a third character differing from the first character and the second character to be a current input value corresponding to the user input, when the first input key is moved to a position of the second input key and positioned at a distance less than a preset threshold from the second input key in response to the user input, or overlapped with the second input key;

wherein the user input corresponds to an input in which the first input key is dragged after the first input key is touched by the user; and wherein the third character is displayed at a position between the first input key and the second input key.

15. A method of providing, by a user interface (UI) apparatus, a UI providing a keyboard layout, the method comprising:

displaying, by a display of the UI apparatus, a first input key assigned to a first character, and a second input key assigned to a second character differing from the first character, among a plurality of characters included in the keyboard layout;

sensing, by a sensor of the UI apparatus, a user input with respect to a first input key; and determining, by a processor of the UI apparatus, a third character differing from the first character and the second character to be an input value corresponding to the user input, when it is determined that the user input corresponds to an input in which the first input key is touched and dragged in a first direction and the first direction corresponds to a direction toward the second input key, among input keys, respectively, corresponding to the plurality of characters;

wherein the user input corresponds to an input in which the first input key is dragged after the first input key is touched by the user; and wherein the third character is displayed at a position between the first input key and the second input key.

16. The method of claim 15, wherein the keyboard layout displays at least a portion of alphabetic characters from A to Z and omits a remaining portion, by alternately displaying one of the alphabetic characters from A to Z and omitting another.

17. The method of claim 15, wherein the keyboard layout displays at least a portion of a plurality of input keys included in a QWERTY keyboard layout and omits a remaining portion, by alternately displaying one of a plurality of alphabetic characters arranged sequentially in the QWERTY keyboard layout and omitting another.

* * * * *